United States Patent
Lu et al.

(10) Patent No.: US 8,990,081 B2
(45) Date of Patent: Mar. 24, 2015

(54) METHOD OF ANALYSING AN AUDIO SIGNAL

(75) Inventors: Wenliang Lu, West Ryde (AU); Dipanjan Sen, Miranda (AU)

(73) Assignee: Newsouth Innovations Pty Limited, New South Wales (AU)

( * ) Notice: Subject to any disclaimer, the term of this patent is extended or adjusted under 35 U.S.C. 154(b) by 1038 days.

(21) Appl. No.: 13/119,898

(22) PCT Filed: Sep. 11, 2009

(86) PCT No.: PCT/AU2009/001203
§ 371 (c)(1),
(2), (4) Date: May 19, 2011

(87) PCT Pub. No.: WO2010/031109
PCT Pub. Date: Mar. 25, 2010

(65) Prior Publication Data
US 2011/0213614 A1    Sep. 1, 2011

(30) Foreign Application Priority Data

Sep. 19, 2008  (AU) ................................ 2008904883

(51) Int. Cl.
*G10L 15/00* (2013.01)
*G10L 15/02* (2006.01)
(Continued)

(52) U.S. Cl.
CPC ................ *G10L 15/02* (2013.01); *G10L 17/02* (2013.01); *G10L 25/15* (2013.01); *G10L 25/69* (2013.01)
USPC ........... 704/236; 704/200; 704/201; 704/205; 704/209; 381/316; 600/559; 607/56; 607/57

(58) Field of Classification Search
CPC ......... G10L 15/02; G10L 15/08; G10L 15/22; G10L 15/063; G10L 15/20
USPC .......................................................... 704/236
See application file for complete search history.

(56) References Cited

U.S. PATENT DOCUMENTS 2,938,079 A * 5/1960 Flanagan ...................... 704/209
3,740,476 A * 6/1973 Atal ............................. 704/207
(Continued)

FOREIGN PATENT DOCUMENTS

JP    2003-514262    4/2003
JP    2004-334160    11/2004
(Continued)

OTHER PUBLICATIONS

A concurrent curve strategy for formant tracking. Yves Laprie. Jan. 2004; In proceeding of: Interspeech 2004—ICSLP, 8th International Conference on Spoken Language Processing, Jeju Island, Korea, Oct. 4-8, 2004.*

(Continued)

*Primary Examiner* — Paras D Shah
*Assistant Examiner* — Fariba Sirjani
(74) *Attorney, Agent, or Firm* — Christie, Parker & Hale, LLP

(57) ABSTRACT

A method of analyzing an audio signal is disclosed. A digital representation of an audio signal is received and a first output function is generated based on a response of a physiological model to the digital representation. At least one property of the first output function may be determined. One or more values are determined for use in analyzing the audio signal, based on the determined property of the first output function.

12 Claims, 12 Drawing Sheets

(51) Int. Cl.
*G10L 17/02* (2013.01)
*G10L 25/69* (2013.01)
*G10L 25/15* (2013.01)

(56) References Cited

U.S. PATENT DOCUMENTS

| | | | | |
|---|---|---|---|---|
| 4,075,423 A * | 2/1978 | Martin et al. | | 704/209 |
| 4,363,102 A * | 12/1982 | Holmgren et al. | | 704/238 |
| 4,661,915 A * | 4/1987 | Ott | | 704/254 |
| 4,721,923 A * | 1/1988 | Bares et al. | | 330/284 |
| 4,805,218 A * | 2/1989 | Bamberg et al. | | 704/241 |
| 5,381,512 A * | 1/1995 | Holton et al. | | 704/200.1 |
| 5,388,182 A * | 2/1995 | Benedetto et al. | | 704/205 |
| 5,621,854 A * | 4/1997 | Hollier | | 704/200.1 |
| 5,768,474 A * | 6/1998 | Neti | | 704/235 |
| 5,799,276 A * | 8/1998 | Komissarchik et al. | | 704/251 |
| 5,856,722 A * | 1/1999 | Haronian et al. | | 310/321 |
| 5,940,798 A * | 8/1999 | Houde | | 704/271 |
| 6,035,270 A | 3/2000 | Hollier et al. | | |
| 6,275,795 B1 * | 8/2001 | Tzirkel-Hancock | | 704/214 |
| 6,505,152 B1 * | 1/2003 | Acero | | 704/209 |
| 6,701,291 B2 * | 3/2004 | Li et al. | | 704/236 |
| 6,708,154 B2 * | 3/2004 | Acero | | 704/260 |
| 6,745,155 B1 * | 6/2004 | Andringa et al. | | 702/189 |
| 6,898,568 B2 * | 5/2005 | Ng et al. | | 704/246 |
| 7,082,332 B2 * | 7/2006 | Blamey et al. | | 607/57 |
| 7,149,320 B2 * | 12/2006 | Haykin et al. | | 381/320 |
| 7,162,415 B2 * | 1/2007 | Holzrichter et al. | | 704/201 |
| 7,164,771 B1 * | 1/2007 | Treurniet et al. | | 381/56 |
| 7,366,656 B2 * | 4/2008 | Furst-Yust et al. | | 704/200.1 |
| 7,480,615 B2 * | 1/2009 | Attias et al. | | 704/240 |
| 7,636,659 B1 * | 12/2009 | Athineos et al. | | 704/205 |
| 7,756,703 B2 * | 7/2010 | Lee et al. | | 704/209 |
| 7,797,051 B2 * | 9/2010 | Klefenz | | 607/57 |
| 7,941,223 B2 * | 5/2011 | Zierhofer et al. | | 607/56 |
| 7,996,212 B2 * | 8/2011 | Klefenz | | 704/200 |
| 8,204,741 B2 * | 6/2012 | Hatzianestis et al. | | 704/206 |
| 8,280,087 B1 * | 10/2012 | Bacon et al. | | 381/316 |
| 8,311,812 B2 * | 11/2012 | Kroeker et al. | | 704/209 |
| 8,535,236 B2 * | 9/2013 | Heinz et al. | | 600/559 |
| 8,682,650 B2 * | 3/2014 | Gray et al. | | 704/200 |
| 2005/0004792 A1 * | 1/2005 | Ando et al. | | 704/217 |
| 2005/0008179 A1 * | 1/2005 | Quinn | | 381/326 |
| 2005/0091043 A1 * | 4/2005 | Narusawa | | 704/205 |
| 2005/0171774 A1 * | 8/2005 | Applebaum et al. | | 704/250 |
| 2005/0226398 A1 * | 10/2005 | Bojeun | | 379/93.15 |
| 2005/0234366 A1 | 10/2005 | Heinz et al. | | |
| 2006/0025989 A1 | 2/2006 | Mesgarani et al. | | |
| 2006/0080087 A1 * | 4/2006 | Vandali et al. | | 704/207 |
| 2006/0106446 A1 | 5/2006 | Fridman et al. | | |
| 2007/0005348 A1 * | 1/2007 | Klefenz | | 704/202 |
| 2008/0059156 A1 * | 3/2008 | Han et al. | | 704/207 |
| 2010/0042406 A1 * | 2/2010 | Johnston et al. | | 704/200.1 |
| 2010/0145681 A1 * | 6/2010 | Begel | | 704/200.1 |
| 2010/0250242 A1 * | 9/2010 | Li | | 704/200.1 |
| 2011/0249843 A1 * | 10/2011 | Holmberg et al. | | 381/316 |
| 2014/0081644 A1 * | 3/2014 | Usher et al. | | 704/275 |

FOREIGN PATENT DOCUMENTS

| | | |
|---|---|---|
| JP | 2006-195449 | 7/2006 |
| JP | 2007-143202 | 6/2007 |
| JP | 2007-264432 | 10/2007 |
| WO | WO 94/00922 | 1/1994 |
| WO | WO 01/35393 A1 | 5/2001 |
| WO | WO 2007/000231 A1 | 1/2007 |

OTHER PUBLICATIONS

Extended European Search Report for corresponding European Patent Application No. 09 81 3876, dated Nov. 22, 2011, 9pp.
International Search Report, dated Nov. 26, 2009, correspodning to PCT/AU2009/001203.
Office action for Japanese Patent Application No. 2011-527151, drafted Apr. 18, 2013, 6 pp. including English translation.

* cited by examiner

METHOD OF ANALYSING AN AUDIO SIGNAL

CROSS-REFERENCE TO RELATED APPLICATION

This application is a National Phase Patent Application and claims the priority of International Application Number PCT/AU2009/001203, filed on Sep. 11, 2009, which claims priority of Australian Patent Application Number 2008904883, filed on Sep. 19, 2008.

FIELD OF THE INVENTION

The present invention relates generally to audio and, in particular, to a method and apparatus for analysing an audio signal. The present invention further relates to a computer program product including a computer readable medium having recorded thereon a computer program for analysing an audio signal.

BACKGROUND

Deployment of a multitude of speech coding and synthesis systems on telecommunications networks, as well as in auditory prosthetic systems, has increased the importance of accurate evaluation and monitoring of quality of speech signals and more generally audio signals.

There are a number of known methods of evaluating speech quality based on subjective testing. An absolute Category Rating (ACR) system, such as a Mean Option Score (MOS) testing, provides a one dimensional quality measurement. The Diagnostic Acceptability Measure (DAM) is another method of evaluating speech quality which requires subjective testing. The Diagnostic Acceptability Measure provides a multidimensional quality measurement based on axes such as "interrupted" and "tinny".

Alternative to subjective measurement methods are objective methods of measuring speech quality. One such objective method of measuring speech quality is known as Perceptual Evaluation of Speech Quality (PESQ) algorithm. The Perceptual Evaluation of Speech Quality algorithm has been standardised by the International Telecommunications Union (ITU). The Perceptual Evaluation of Speech Quality algorithm is however inappropriate for many synthesis systems including low bit-rate vocoders (i.e., below 4 kbps) as well as speech degraded by environmental conditions such as babble and military vehicle noise. In addition, the Perceptual Evaluation of Speech Quality algorithm fails to predict the quality of low pass filtered speech as well as speech degraded by narrow band noise.

The Perceptual Evaluation of Speech Quality algorithm uses a psychoacoustic masking model (PMM) in order to predict the mean option score. The psychoacoustic masking model is an attempt at modelling the linear component of what is a highly non-linear hydromechanics of the human cochlea. In essence, the psychoacoustic masking model is a very approximate estimation of the linear component of the Basilar membrane (BM) response. As such, the psychoacoustic masking model is not able to predict a number of linear and non linear characteristics of the true physiological response of the cochlea and its corresponding psychophysics.

SUMMARY

It is an object of the present invention to substantially overcome, or at least ameliorate, one or more disadvantages of existing arrangements.

According to a first aspect of the present disclosure, there is provided a method of analysing an audio signal, the method comprising the steps of:
  (a) receiving a digital representation of an audio signal;
  (b) generating a first output function based on a response of a physiological model to the digital representation;
  (c) determining at least one property of the first output function;
  (d) determining one or more values for use in analysing the audio signal, based on the determined property of the first output function.

According to another aspect of the present disclosure, there is provided an apparatus for analysing an audio signal, the apparatus comprising:
  means for receiving a digital representation of an audio signal;
  means for generating a first output function based on a response of a physiological model to the digital representation;
  means for determining at least one property of the first output function;
  means for determining one or more values for use in analysing the audio signal, based on the determined property of the first output function.

According to another aspect of the present disclosure, there is provided a system for analysing an audio signal, the system comprising:
  a memory comprising data and a computer program;
  a processor coupled to the memory for executing the computer program, the computer program comprising instructions for:
    (a) receiving a digital representation of an audio signal;
    (b) generating a first output function based on a response of a physiological model to the digital representation;
    (c) determining at least one property of the first output function;
    (d) determining one or more values for use in analysing the audio signal, based on the determined property of the first output function.

According to another aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings in which.

DETAILED DESCRIPTION INCLUDING BEST MODE

Figure 1:
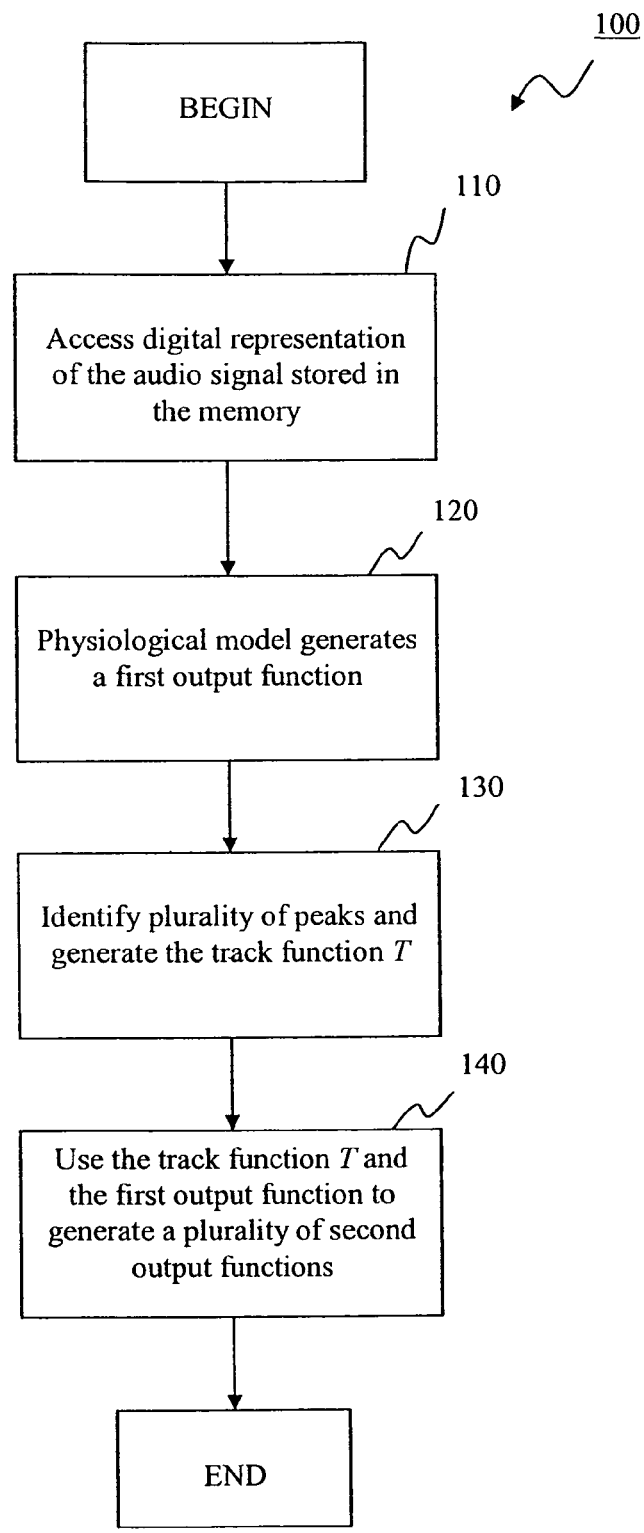
FIG. 1 shows a method of analysing an audio signal.

Where reference is made in any one or more of the accompanying drawings to steps and/or features, which have the same reference numerals, those steps and/or features have for the purposes of this description the same function(s) or operation(s), unless the contrary intention appears.

Figure 3:
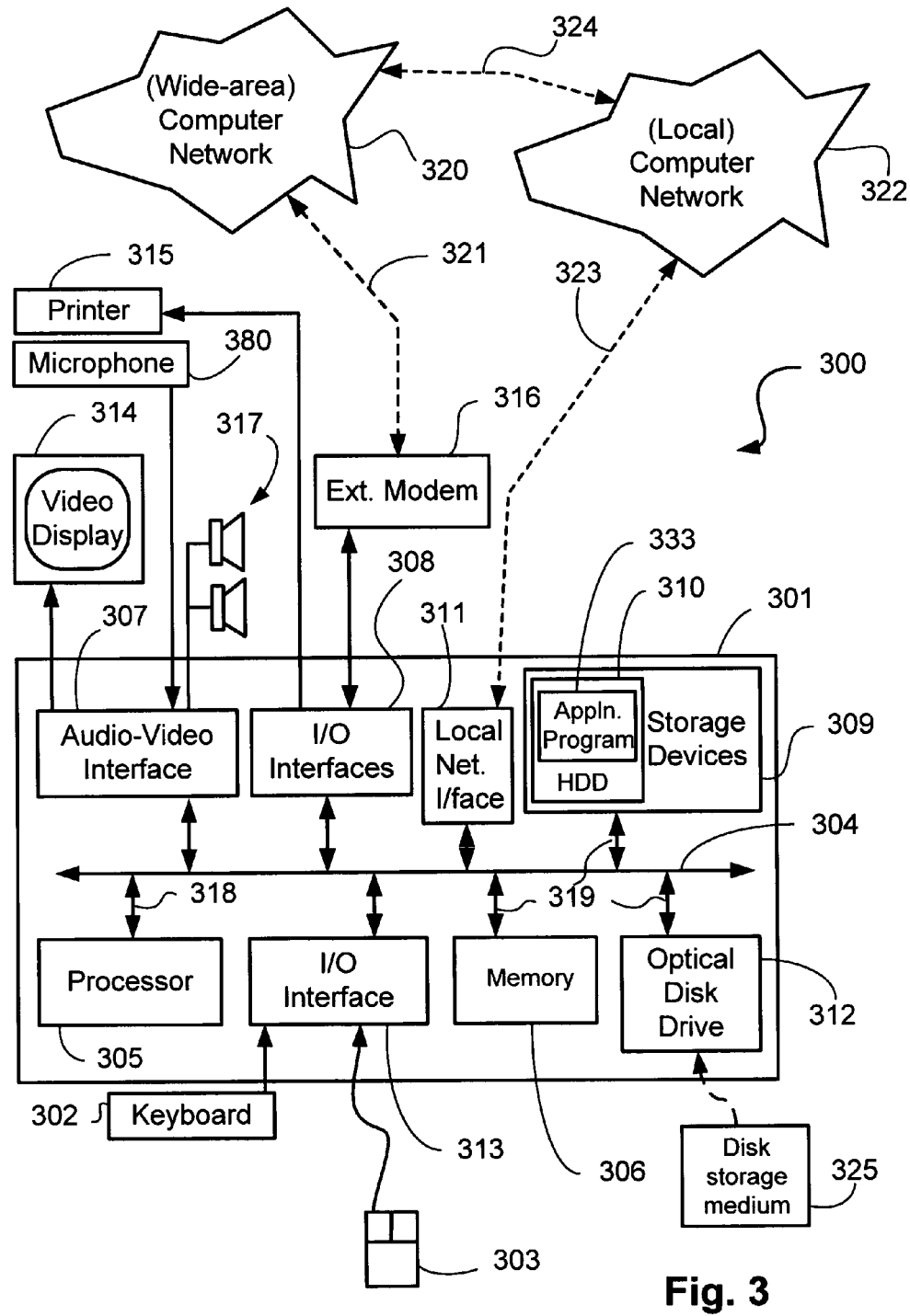
FIG. 3 is a schematic block diagram of a general purpose computer system upon which the arrangements described can be practiced.

FIG. 1 is a flow diagram showing a method 100 of analysing an audio signal. The method 100 may be implemented using a computer system 300, as shown in FIG. 3. As seen in FIG. 3, the computer system 300 is formed by a computer module 301, input devices such as a keyboard 302, a mouse pointer device 303, a scanner 326, a microphone 380, and output devices including a printer 315, a display device 314 and loudspeakers 317.

An external Modulator-Demodulator (Modem) transceiver device 316 may be used by the computer module 301 for communicating to and from a communications network 320 via a connection 321. The network 320 may be a wide-area network (WAN), such as the Internet or a private WAN. Where the connection 321 is a telephone line, the modem 316 may be a traditional "dial-up" modem. Alternatively, where the connection 321 is a high capacity (eg: cable) connection, the modem 316 may be a broadband modem. A wireless modem may also be used for wireless connection to the network 320.

The computer module 301 typically includes at least one processor unit 305, and a memory unit 306 for example formed from semiconductor random access memory (RAM) and semiconductor read only memory (ROM). The module 301 also includes a number of input/output (I/O) interfaces including an audio-video interface 307 that couples to the video display 314, loudspeakers 317 and microphone 380, an I/O interface 313 for the keyboard 302, mouse 303 and scanner 326, and an interface 308 for the external modem 316 and printer 315. In some implementations, the microphone 380 may be incorporated within the computer module 301. Also, in some implementations, the modem 316 may be incorporated within the computer module 301, for example within the interface 308. The computer module 301 also has a local network interface 311 which, via a connection 323, permits coupling of the computer system 300 to a local computer network 322, known as a Local Area Network (LAN). As also illustrated, the local network 322 may also couple to the wide network 320 via a connection 324, which would typically include a so-called "firewall" device or device of similar functionality. The interface 311 may be formed by an Ethernet™ circuit card, a Bluetooth™ wireless arrangement or an IEEE 802.11 wireless arrangement.

The interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data. Portable memory devices, such optical disks (eg: CD-ROM, DVD), USB-RAM, and floppy disks for example may then be used as appropriate sources of data to the system 300.

The components 305 to 313 of the computer module 301 typically communicate via an interconnected bus 304 and in a manner which results in a conventional mode of operation of the computer system 300 known to those in the relevant art. Examples of computers on which the described arrangements can be practised include IBM-PC's and compatibles, Sun Sparc stations, Apple Mac™ or alike computer systems evolved there from.

The method 100 may be implemented as one or more software application programs 333 executable within the computer system 300. In particular, the steps of the method 100 are affected by instructions in the software that are carried out within the computer system 300. The software may also be divided into two separate parts, in which a first part and the corresponding software modules performs the described method 100 and a second part and the corresponding software modules manage a user interface between the first part and the user.

The software may be stored in a computer readable medium, including the storage devices described below, for example. The software is loaded into the computer system 300 from the computer readable medium, and then executed by the computer system 300. A computer readable medium having such software or computer program recorded on it is a computer program product. The use of the computer program product in the computer system 300 preferably effects an advantageous apparatus for implementing the described methods.

The software 333 is typically stored in the hard disk drive 310 or the memory 306. The software is loaded into the computer system 300 from a computer readable medium, and then executed by the computer system 300. Thus for example the software may be stored on an optically readable CD-ROM medium 325 that is read by the optical disk drive 312. A computer readable medium having such software or computer program recorded on it is a computer program product. The use of the computer program product in the computer system 300 preferably effects an advantageous apparatus for implementing the described methods.

In some instances, the application programs 333 may be supplied to the user encoded on one or more CD-ROM 325 and read via the corresponding drive 312, or alternatively may be read by the user from the networks 320 or 322. Still further, the software can also be loaded into the computer system 300 from other computer readable media. Computer readable storage media refers to any storage medium that participates in providing instructions and/or data to the computer system 300 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 301. Examples of computer readable transmission media that may also participate in the provision of software, application programs, instructions and/or data to the computer module 301 include radio or infra-red transmission channels as well as a network connection to another computer or networked device, and the Internet or Intranets including e-mail transmissions and information recorded on Websites and the like.

The second part of the application programs 333 and the corresponding code modules mentioned above may be executed to implement one or more graphical user interfaces (GUIs) to be rendered or otherwise represented upon the display 314. Through manipulation of typically the keyboard 302 and the mouse 303, a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

The method 100 of analysing the audio signal may alternatively be implemented in dedicated hardware such as one or more integrated circuits performing the functions or sub functions of the method 100. Such dedicated hardware may include digital signal processors, or one or more microprocessors, associated memories, peripherals and displays. Examples of such dedicated hardware may include a telephone, a mobile telephone, a radio transreceiver, a personal digital assistant (PDA), a Blackberry™, a laptop or similar device.

The method 100 begins at step 110, where the processor 305 accesses a digitised representation of the audio signal. The digitised representation of the audio signal may be stored in the memory 306 and/or the hard disk drive 310. Alternatively, the digitised representation may be acquired by the processor 305 via the I/O interface 308.

The audio signal may have been received by the processor 305, via the microphone 380 and the audio-video interface 307. Typically, the audio signal is an acoustic wave. The audio signal received at the microphone 380 is a superposition of acoustic waves originating from a desired audio source and a background audio source. The desired audio source may be human speech, while the background audio source may consist of one or more unwanted noises, including unwanted human speech and environmental noise.

The microphone 380 converts the audio signal into an electrical signal, and the audio-video interface 307 converts the electrical signal into the digitised representation required by the computer system 300. The digitised representation is stored in the memory 306. In some implementations the digitised representation may be additionally stored in the hard disk drive 310.

The digitised representation may also be coded using a coder (not shown). The coder may be implemented as software resident on the hard disk drive 310 and being controlled in its execution by the processor 305. The coder may be configured to any suitable standard such as the International Telecommunications Union standards G.729 and G.723. The coder may introduce additional noise into the digitised representation through coding noise. Generally the coding noise is highly correlated with the digitised representation, but certain environmental noise (such as 'babble' noise) may also be correlated with the digitised representation.

In another implementation, the digitised representation of the audio signal may already be stored on the storage device 309 or on the optically readable CD-ROM medium 325. In such an alternative implementation, the computer system 300 transfers the digitised representation into the memory 306.

In still another implementation, the digitised representation of the audio signal may originate from artificially generated text or speech generated by text to speech synthesis systems.

The digitised representation of the audio signal serves as an input function for a physiological model at a next step 120. The physiological model may be implemented as one of the software application programs 333 executable by the computer system 300. At step 120, the physiological model, under execution of the processor 305, uses the input function to generate a first output function. The first output function is a simulated response of the physiological model to the audio signal. The first output function will be described in detail below.

The physiological model is preferably a one, two or three-dimensional hydro-mechanical cochlear model (CM) which determines various electrical and mechanical responses in a human cochlea. These electrical and mechanical responses include a basilar membrane (BM) response, an inner hair cell (IHC) response, a basilar membrane velocity and an inner hair cell intracellular voltage.

The digitised representation of the audio signal is preferably a one-dimensional input function comprising temporal t variation of the audio signal. The first output function is preferably a two dimensional function comprising temporal t and spatial p variation of various cochlear responses. Therefore, the input function may be considered as a vector, with each element being the amplitude of the audio signal. The first output function may also be considered a matrix, with each element of the matrix being selected from a group consisting of basilar membrane response, inner hair cell response, basilar membrane velocity and inner hair cell intracellular voltage.

In the input function, adjacent elements typically correspond to a difference of 1-250 µs. In the first output function, adjacent elements along a temporal axis correspond to a difference of 1-250 µs and adjacent elements along a spatial axis correspond to a distance of 0.01-0.1 micrometer. The above ranges are meant to provide typical range of values, and are only constrained by hardware and computational complexity requirements.

Figure 2A:
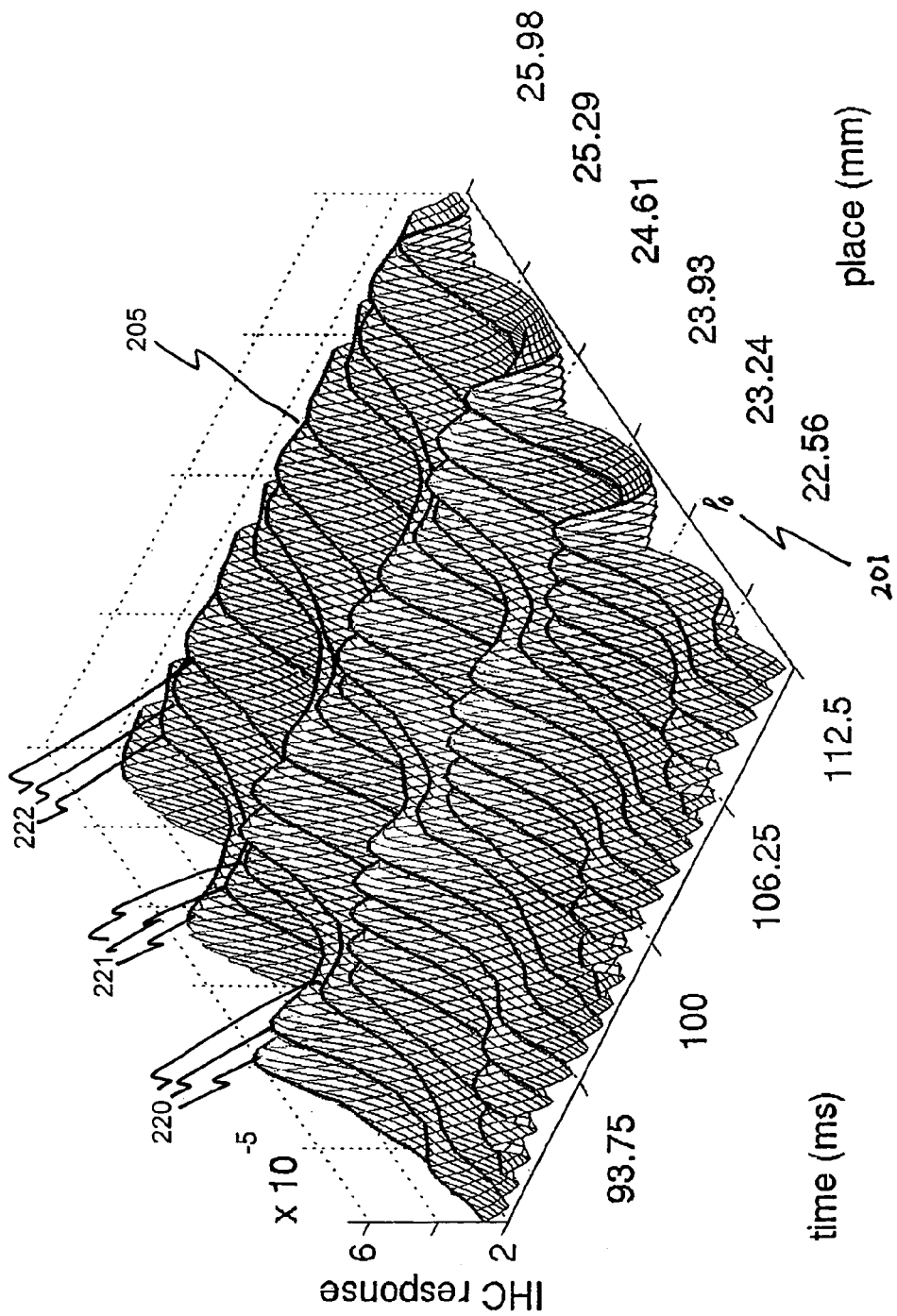
FIG. 2A shows an exemplary visualisation of an output function when an audio source is a voiced section of human speech.
Figure 2B:
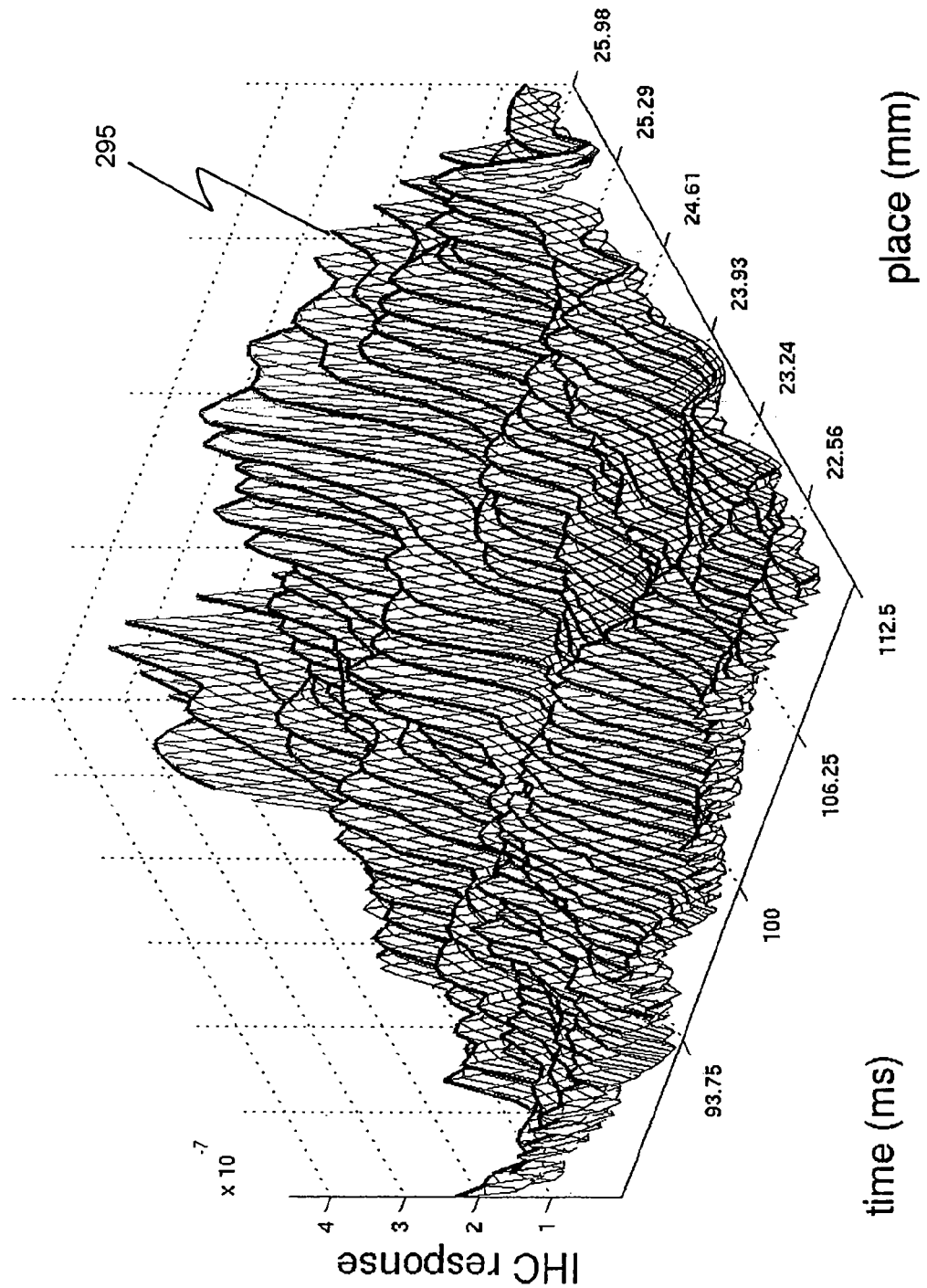
FIG. 2B shows an exemplary visualisation of the output function when the audio source is an unvoiced section of human speech.
Figure 2C:
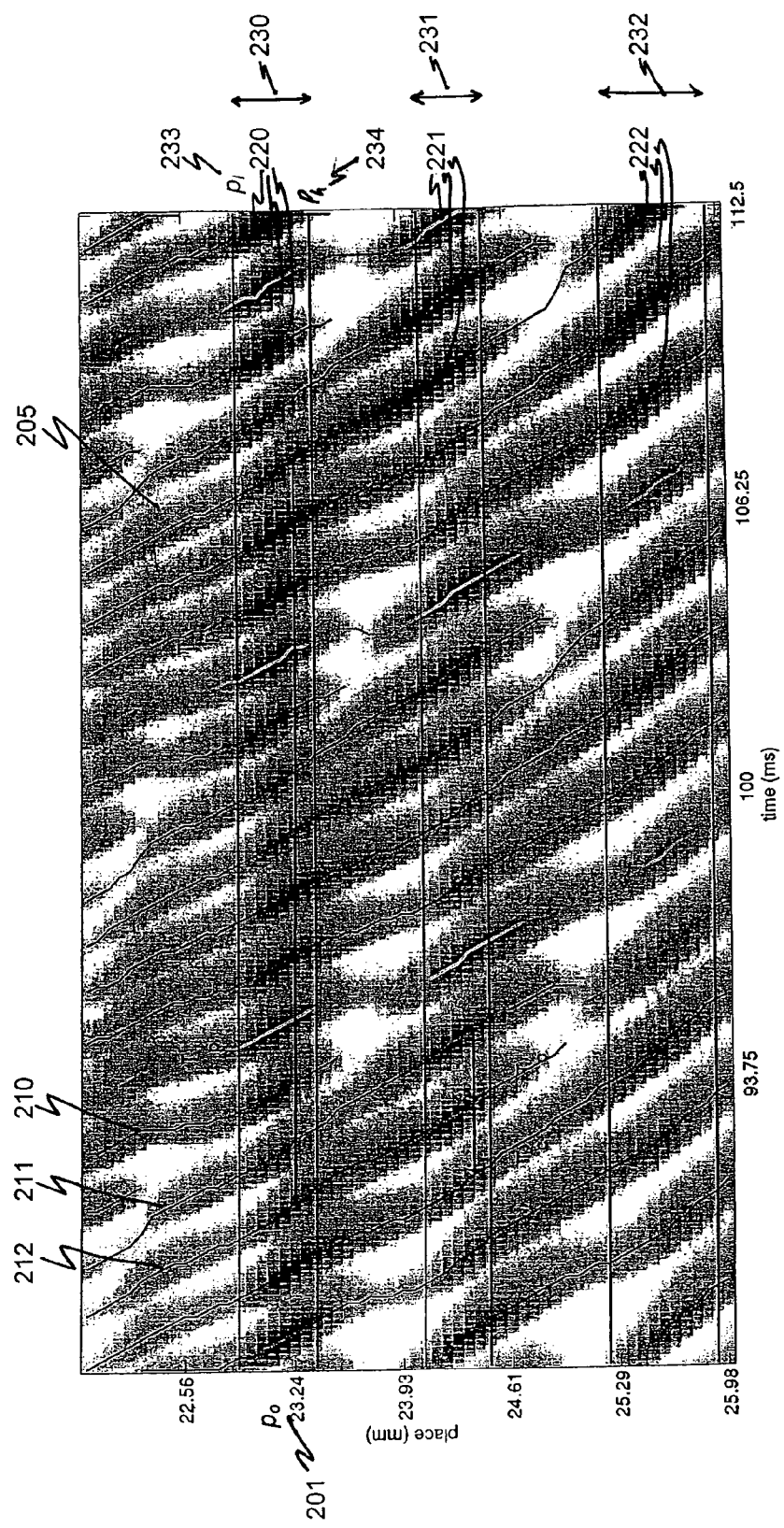
FIG. 2C shows another view of the exemplary visualisation in FIG. 2A.
Figure 2D:
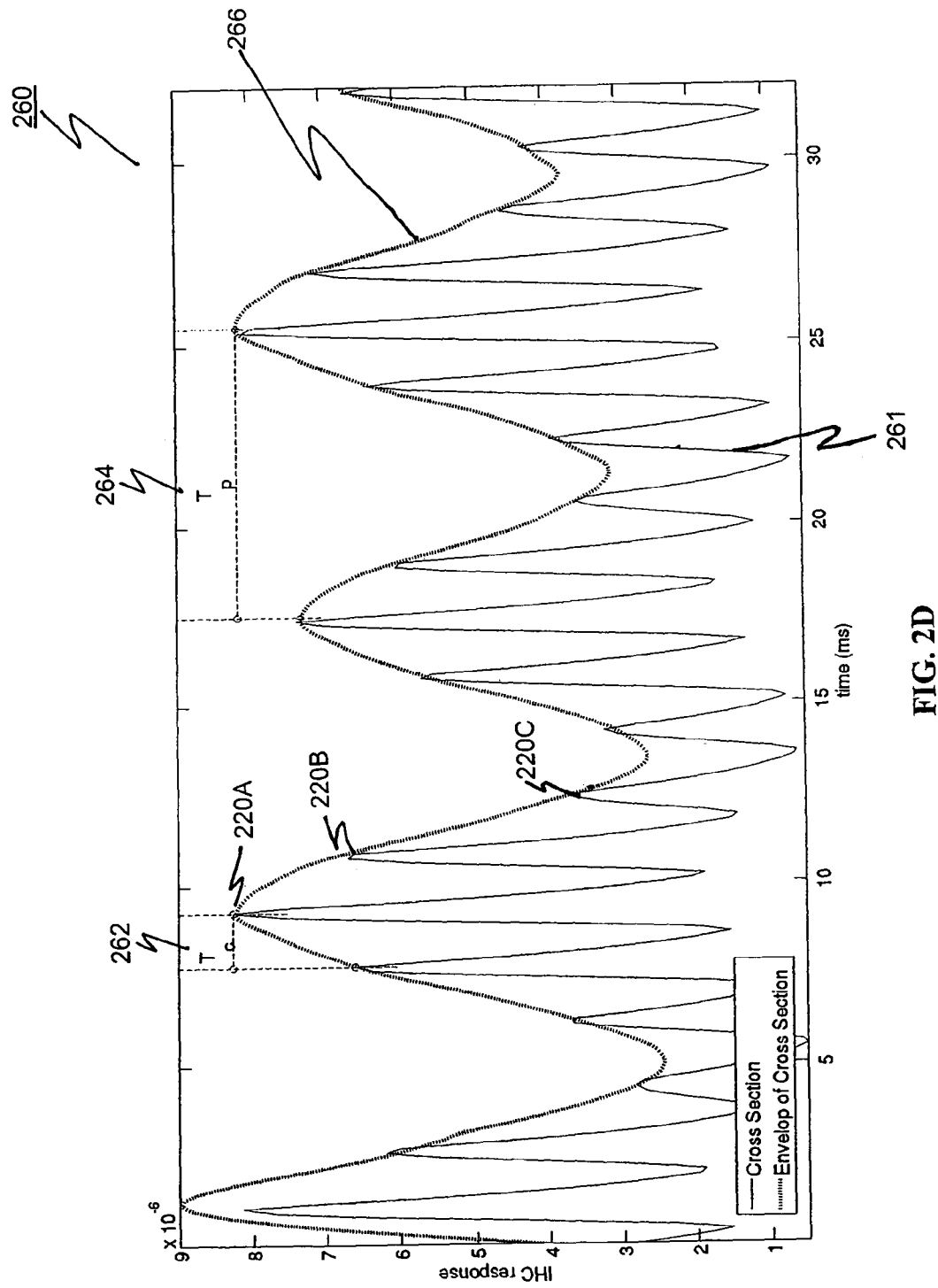
FIG. 2D shows an exemplary cross-sectional visualisation of the exemplary visualisation in FIG. 2A.

FIG. 2A shows an exemplary visualisation of the first output function 205, when the desired audio source is a voiced section of human speech. FIG. 2B is an exemplary visualisation of the first output function 295, when the desired audio source is an unvoiced section of human speech. FIG. 2C is another visualisation of the first output function 205 of FIG. 2A. FIG. 2D is an exemplary cross-sectional visualisation of the first output function 205 for a given spatial location $p_0$ 201 as seen in FIG. 2A.

FIGS. 2A and 2B represent the evolution of the first output function (e.g., 205, 295) over the temporal and spatial domains. In FIG. 2A the first output function 205 is slow and characterised by a plurality of peaks (e.g., 220, 221, 222) that recur deterministically over time and place—forming a distinct pattern or structure. This is in contrast to the absence of such deterministic patterns in the example output function 295 shown in FIG. 2B. Additionally, amplitude of the first output function 205 for the voiced section of human speech is significantly higher than that of the first output function 295 for the unvoiced section of human speech.

FIG. 2C is another visualisation of the first output function 205. FIG. 2C illustrates the first output function 205 in a two dimensional manner. The plurality of peaks (e.g., 220, 221, 222) in FIG. 2A correspond to the dark regions of FIG. 2C. The dark regions (e.g., 220, 221 and 222) of FIG. 2C correspond to areas of high amplitude for the first output function 205. In FIG. 2C, evolution of the plurality of peaks is indicated by a series of continuous lines or "tracks" (e.g., 210, 211, 212) that each peak (e.g., 220) in the first output function 205 takes along the space-time dimensions. The series of tracks (e.g., 210, 211, 212) shows the progression of the plurality of peaks (e.g., 220, 221, 222) across the temporal and spatial domains, as the output function 205 evolves.

The voiced sections of human speech, as shown in FIGS. 2A and 2C, are indicated by long unbroken lengths of tracks (e.g., 210, 211, 212). This indicates slow and uniform evolution of the first output function 205 over space and time. Another characteristic of the first output function 205, when the desired audio source is the voiced section of human speech, are one or more regions of high amplitude as indicated by the dark areas of FIG. 2C (e.g., 220, 221, 222). The plurality of peaks (e.g., 220, 221, 222) are also known as a plurality of "formants", with each formant corresponding to a frequency at which a human vocal tract resonates. Around the vicinity of the plurality of peaks (e.g., 220, 221, 222), the series of tracks (e.g., 210, 211, 212) are unbroken and substantially periodic in space and time. Such characteristics are typically non-existent in the first output function 295 for the unvoiced section of human speech.

FIG. 2D is an exemplary cross-sectional visualisation of the first output function 205 at the given fixed spatial location $p_0$ 201 as a function of time. A response $CM_{p_0}(t)$ 261 of the hydro-mechanical cochlear model is a quasi-periodic waveform when the input function is human speech. The response 261 consists of a first mode of periodicity with a period $T_c$ 262 and a second mode of periodicity with period $T_p$ 264. The first mode of periodicity corresponds to a characteristic frequency $f_c = 1/T_c$ of the response 261. The second mode of periodicity corresponds to a smooth low-passed envelope $e_{p_0}(t)$ 266 of the response 261 where $e_{p_0}(t) = E\{CM_{p_0}(t)\}$ and E represents an envelope operator. The second mode of periodicity $T_p$ 264 is due to the pitch of the human speech and is independent of place p except for a slow spatial evolution.

Due to causality, at adjacent spatial locations, $p_{0+1}$, the envelope 266 will have evolved, albeit slowly, when the desired audio source is human speech. The rate of such evolution is a function of the amount of voicing, where for highly voiced sections, this evolution is slow. In contrast, as seen in FIG. 2B, the rate of evolution is rapid when the desired audio source is the unvoiced section of human speech.

Similarly, the rate of evolution of the envelope 266 may be observed at two temporal positions $t_0$ and $t_{0+1}$, where a spatial response $CM_{t_0}(p)$ is a function of spatial variation p at a first temporal position $t_0$. The evolution of the first output function 205 may thus be followed both spatially and temporally since the envelope 266 is evolving in both spatial and temporal dimensions. FIG. 2A and FIG. 2C illustrate the evolution of the output function 205.

The method 100 continues at the next step 130, where the processor 305 uses both spatial p and the temporal t variation of the first output function (205, 295), much like the examples of FIGS. 2A to 2D, to identify at least one property of the first output function (205, 295). In particular, the location of the plurality of peaks (e.g., 220A, 220B, 220C) in the first output function (e.g., 205) is stored in a track function T. A method 500 of identifying the plurality of peaks (e.g., 220A, 220B, 220C) in the first output function, as executed at step 130, will be described in detail below with reference to FIG. 5.

Then at the next step 140 of the method 100, the processor 305 utilises the track function T and the first output function to generate a plurality of second output functions called a Track Center Point (TCP) and Salient Formant Point (SFP). As described, the first output function is the physiological model response to the one-dimensional input function, the input function being the digitised representation of the audio signal. A method 600 of determining the plurality of second output functions, as executed at step 140, will be described in detail below with reference to FIG. 6. As will be described, the plurality of second output functions are used in analysing the audio signal (i.e. the input function), based on the determined property (e.g., the location of the peaks 220A, 220B, 220C) of the first output function 205.

Figure 5:
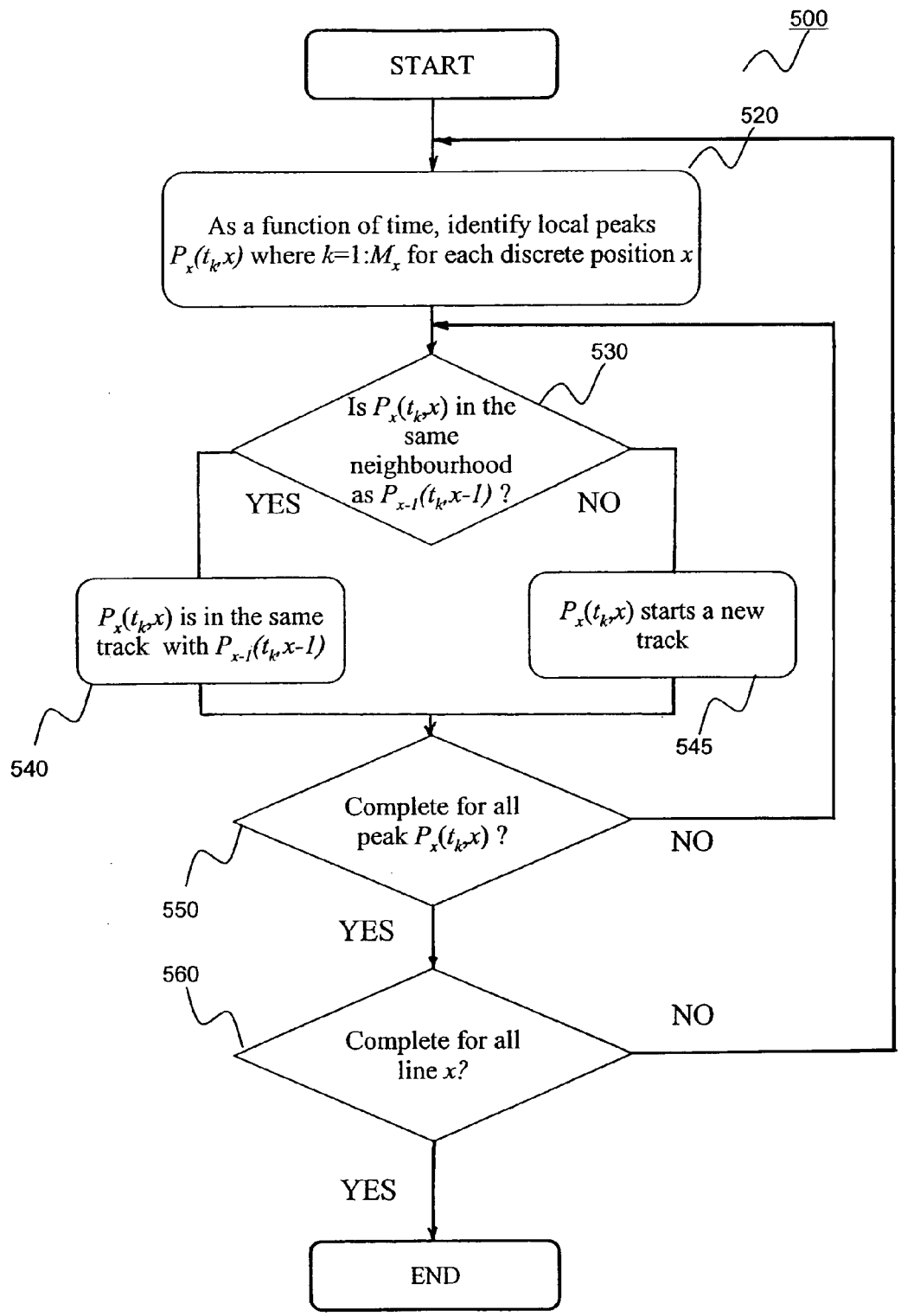
FIG. 5 is a flow diagram of a method of identifying a plurality of tracks comprising of local peaks in the output function of FIG. 2A.

The method 500 of identifying the plurality of peaks (e.g. 220A, 220B, 200C) in the first output function, as executed at step 130, will be described in detail below with reference to FIG. 5. The method 500 will be described by way of example with reference to the first output function 205. The method 500 may be implemented as software resident on the hard disk drive 310 and being controlled in its execution by the processor 305.

The method 500 begins at a step 520, where the processor 305 uses the temporal t variation of the first output function (i.e. a fixed spatial position x) to identify the plurality of peaks, $P_x(t_{k,x})$, k=1: $M_x$, where $M_x$ represents the maximum number of peaks at the fixed spatial position x, while $t_k$ represents the temporal positions at which the peaks (e.g. 220A, 220B, 220C) occur.

At the next step 530 the processor 305 determines whether one of the selected peaks $P_x(t_{k,x})$ (e.g. 220A) is in the same neighbourhood as an adjacent peak $P_{x-1}(t_{k,x-1})$ from an adjoining spatial location, x−1 (not illustrated). The processor 305 executes step 530 by comparing the selected peak $P_x(t_{k,x})$ with the adjacent peak $P_{x-1}(t_{k,x-1})$ in a distinct neighbourhood (i.e. $t_{k,x-1} - t_{backward} \leq t_{k,x} \leq t_{k,x-1} + t_{forward}$). If the selected peak $P_x(t_{k,x})$ (e.g. 220A) is found to be within the distinct neighbourhood, then the selected peak $P_x(t_{k,x})$ (e.g. 220A) is considered to be part of the same track (e.g., 210) as the adjacent peak at the adjoining spatial location $t_{k,x-1}$. If more than one peak is found within the distinct neighbourhood, then the peak closest to point $t_{k,x-1}$ is selected. If no peaks are found within the distinct neighbourhood, then the track 210 is terminated at place x−1, and no further search along the track 210 is performed in the future.

Due to causality, the tracks (e.g., 210) always move towards increasing time and place. For this reason, $t_{backward}$ is small or can even be set to zero. Any new tracks that originate at a higher place (i.e. not at the adjoining spatial location x−1) may be accounted for by ensuring that new peaks not associated with the previous place are not discarded but are stored in the memory 306, for example, for future tracking until the tracks terminate.

If the result of step 530 is true, then the method 500 proceeds according to a "YES" arrow to a step 540. At step 540, the processor 305 determines that the selected peak $P_x(t_{k,x})$ (e.g. 220A) belongs to the same track (e.g. 210) as the adjacent peak $P_{x-1}(t_{k,x-1})$, and the result is stored in the track function T configured within memory 306.

If the result of step 530 is false then the method 500 proceeds according to a "NO" arrow to a step 545 which commences a new track and the result is stored in the track function T configured within memory 306.

The method 500 continues at the next step 550, where the processor 305 determines if step 530 has been performed for all the peaks at the given spatial location x. If the result of the step 550 is true, then the method 500 proceeds according to a "YES" arrow to a step 560. Otherwise, if the result of the step 550 is false, then the method 500 proceeds according to a "NO" arrow to the step 530. At step 560, the processor 305 determines if the step 520 has been performed for all the spatial location x.

If the result of the test step 560 is true, then the method 500 proceeds according to a "YES" arrow and the method 500 concludes. Otherwise, if the result of step 560 is false, then the method 500 proceeds according to a "NO" arrow to return to step 520. Following completion of the method 500, the track function T is stored in the memory 306.

In implementations where the desired audio source is human speech the plurality of second output functions generated at step 140 includes the track center point TCP, and the salient formant point SFP.

As described, the plurality of formants appear in the first output function 205 of FIG. 2A as the plurality of peaks (e.g. 220, 221, 222) which are also seen in the visualisation of the output function 205 of FIG. 2C. From the perspective of the first output function 205,295 (i.e. the cochlea model response), the plurality of formants are distinguished as a spatial (i.e. frequency) entity, rather than a temporal entity, reflecting the association between each place along the length of the cochlea with a characteristic frequency.

In the exemplary visualisation of FIG. 2C the plurality of peaks (e.g. 220, 221, 222) are easily distinguishable within a plurality of Perceptually Relevant Regions (PRR) (e.g. 230, 231, 232). Each perceptual relevant region shows up as a region of high energy on the first output function 205. A step 620 of determining each perceptual relevant region will be described in detail below with reference to FIG. 6.

In FIGS. 2A and 2C, three salient regions (230, 231 and 232) can clearly be identified spatially. These three salient regions (230, 231 and 232) appear as spatial regions centered approximately at 23.11 mm, 24.20 mm and 25.57 mm from the base of the basilar membrane. The spatial location of the salient regions may change minimally with time. The above spatial locations correspond to approximately 4461 Hz, 3707 Hz and 2911 Hz. This minimal change in spatial location can be observed on the first output function 205 by the fact that the number of peaks (e.g., 220) remains unchanged for the duration of the voiced speech, as well as the fact that the plurality of tracks (e.g. 210, 211, 212) are approximately parallel to each other—especially in the regions corresponding to the salient regions (230, 231 and 232) as seen in FIG. 2C. Another characteristic of the first output function 205 at the salient regions (e.g. 230, 231, 232) is the high amplitude of the first output function 205.

Figure 6:
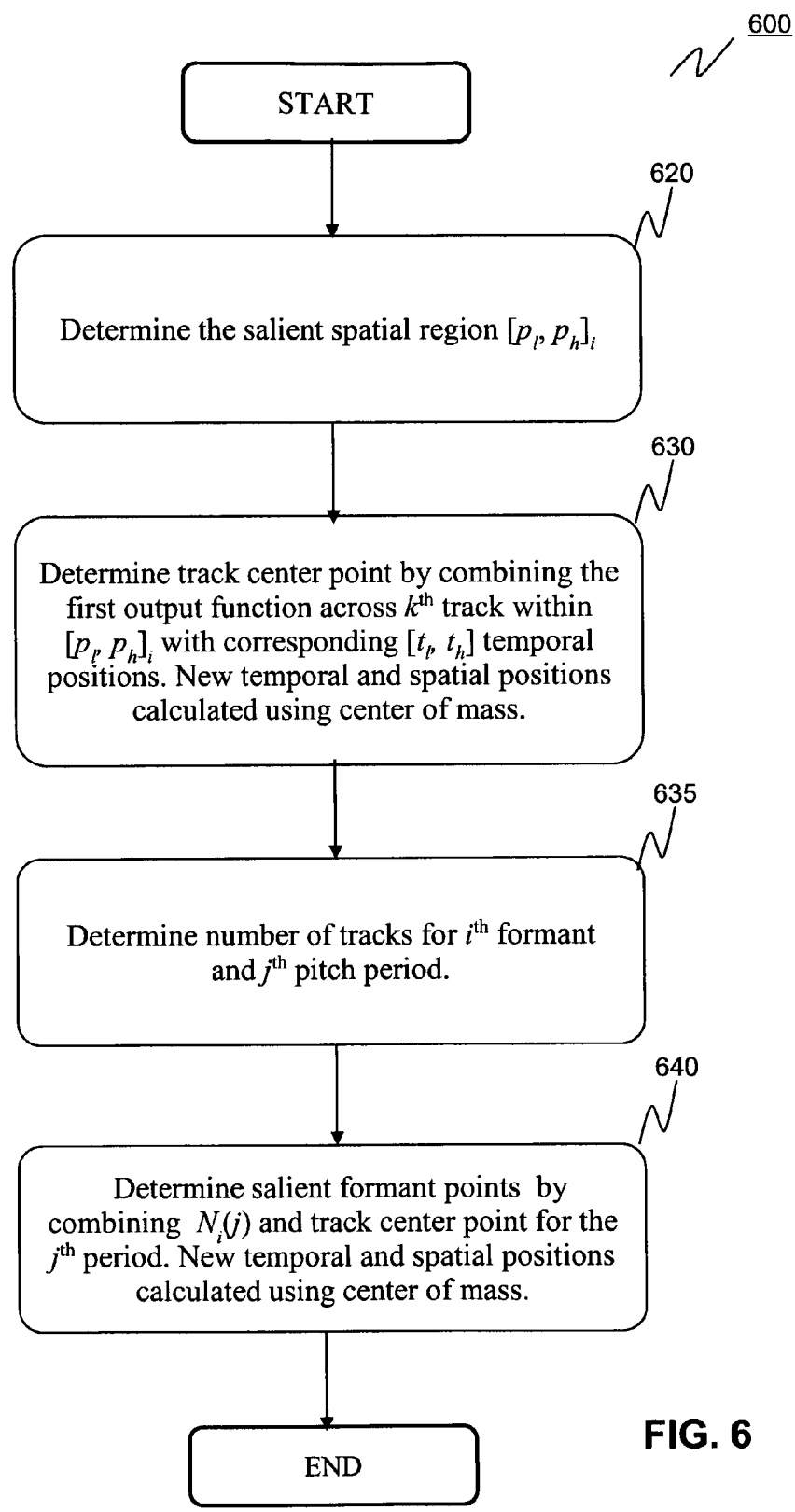
FIG. 6 is a flow diagram of a method of determining a plurality of second output functions.

The method 600 of determining the second output functions, as executed at step 140, will now be described in detail below with reference to FIG. 6. The method 600 may be implemented as software resident in the hard disk drive 310 and being controlled in its execution by the processor 305.

The method 600 begins at the step 620, where the processor 305 determines Perceptually Relevant Regions (PRR) (e.g. 230, 231, 232). The perceptually relevant region (e.g. 230) defines a spatial range from a low place $p_l$ (e.g. 233) to a high place $p_h$ (e.g. 234) where the salient information (e.g. 220) is deemed to exist. Accordingly, the spatial range $[p_l, p_h]$ is determined at step 620. Typically, the perceptually relevant regions (e.g. 230, 231, 232) are stored as a variable in the memory 306.

The low place $p_l$ (e.g. 233) and the high place $p_h$ (e.g. 234) are determined by two constraints. A first constraint ensures that energy of the first output function 205 within the spatial range $[p_l, p_h]$ is above a signal dependent threshold. This reflects the fact that the amplitude of the first output function 205 in the formant regions (e.g. 230, 231, 232) is significantly higher than other regions. A second constraint ensures that the temporal distance for neighbouring tracks are approximately equal within the spatial range $[p_l, p_h]$.

The method 600 continues at the next step 630, where the processor 305 determines the track center point for each $k^{th}$ track within the perceptually relevant region (e.g. 230). The first output function 205 within this spatial range is bounded by $CM_{p_l}(t_l)$ and $CM_{p_h}(t_h)$ where $[t_l, t_h]$ correspond to the spatial range $[p_l, p_h]$ of the first output function 205. The track center point TCP is given by a center of mass of the first output function 205 across the spatial range. The track center point TCP for every $k^{th}$ track and $i^{th}$ formant, in the perceptually relevant regions are characterised by three values: a track center point response TCP($\psi, \tau$), a temporal variable $\tau$ and a spatial position $\psi$, which are calculated according to Equation (1), below:

$$TCP(\psi, \tau) = \frac{1}{p_h - p_l} \sum_{p=p_l, t=t_l}^{p=p_h, t=t_h} IHC[p, t] \qquad (1)$$

where:

$$\tau(i, k) = \frac{1}{TCP} \sum_{p=p_l, t=t_l}^{p=p_h, t=t_h} IHC[p, t]t$$

$$\psi(i, k) = \frac{1}{TCP} \sum_{p=p_l, t=t_l}^{p=p_h, t=t_h} IHC[p, t]p$$

One characteristic of the tracks (e.g. 211) at the perceptually relevant regions (e.g. 230) is that the tracks are quasi-parallel on the temporal-spatial plane. Adjacent tracks (e.g. 210, 212) across a secondary mode of periodicity $T_p$ 234 are also substantially similar in intensity with adjacent tracks.

In a further attempt at reducing dimensionality, while keeping the most salient component of one of the tracks (e.g. 210), all tracks within a single secondary mode of periodicity $T_p$ 234 may be reduced to a single point given by the centre of mass of the track center points in one period.

At the next step 635, the processor 305 determines a number of tracks $N_i(j)$ for $i^{th}$ formant at a time index j. A pitch period can be determined from either the input function (the digital representation of the audio signal) or the first output function 205.

Then at step 640, the processor 305 determines the salient formant point. The track center points TCP in one pitch period can be reduced to a single point by taking the center of mass of all the track center points in one pitch period. Result of this combination is called the salient formant point SFP. The processor 305 determines the salient formant point SFP value in accordance with the following Equation (2):

$$SFP(\psi', \tau') = \frac{1}{N_i(j)} \sum_{n=1}^{N_i(j)} TCP_n \qquad (2)$$

where:

$$\tau'(i, j) = \frac{1}{SFP} \sum_{n=1}^{N_i(j)} (TCP_n)\tau_n$$

$$\psi'(i, j) = \frac{1}{SFP} \sum_{n=1}^{N_i(j)} (TCP_n)\psi_n$$

where the salient formant point SFP is indexed by a modified temporal variable $\tau'$ and a modified spatial position $\psi'$.

The plurality of second output functions which includes the track center point TCP, and the salient formant point SFP, are stored in the memory 306 and/or the hard disk drive 310.

The method 100 may be useful in a variety of different speech based applications. The second output functions such as salient formant points and track center points lend themselves to use in applications such as speech recognition, speaker recognition and speaker verification. In each of these applications, salient formant points and track center points complement an existing set of features (such as Mel-frequency cepstral coefficients—MFCCs) which form the basis for statistical pattern recognition to achieve the desired recognition and verification. The following paragraphs outline some of the applications which may use the salient formant points and track center points.

Figure 7:
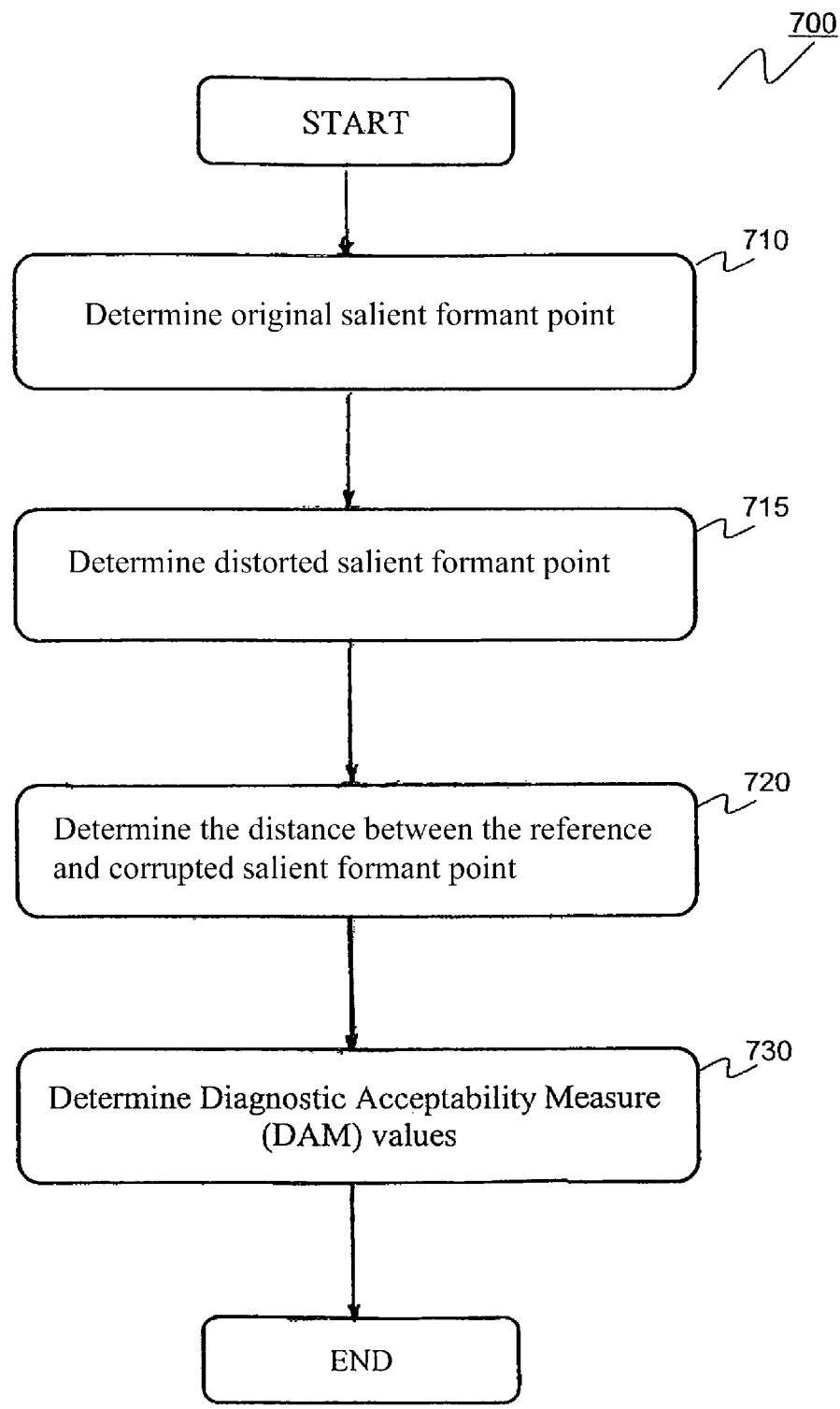
FIG. 7 is a flow diagram showing a method of determining objective measures of speech quality using salient formant points determined in accordance with the method of FIG. 1.

FIG. 7 is a flow diagram showing a method 700 of determining objective measures of speech quality using the salient formant point SFP determined in accordance with the method 100. The method 700 will be described by way of example with reference to determining quality-of-service of a telecommunication system, such as a voice over internet protocol (VoIP) telecommunications system. However, the method 700 may be used for various other applications such as diagnostic testing of a communication system, determining fidelity of an audio equipment, characterising distortion in an occupational environment (e.g., a factory, inside a vehicle, a conference room), and characterising distortion in an entertainment environment (e.g. concert hall). The method 700 may be implemented as software resident on the hard disk drive 310 and being controlled in its execution by the processor 305.

The method 700 typically requires first and second digitised representations of audio signals. The first digitised representation, referred to as "reference" or "original", is a desired audio signal that is uncorrupted. Typically, the desired audio signal is human speech. The second digitised representation, referred to as "corrupted" or "distorted", is the desired audio signal that has been corrupted by distortion and addition of noise. In the present example, with reference to determining the quality-of-service of the telecommunication system, the desired audio signal may become corrupted due to the telecommunication network, associated equipment between a sender and a receiver, and environmental noise recorded by the microphone 380 while recording the human speech. The environmental noise may be car noise and babble noise.

In one implementation of the method 700, the second digitised representation may be created. The second digitised representation may be created by generating the audio signal at a sender end of the telecommunications system, transmitting the desired audio signal through the telecommunication network (adding distortion and noise) and collecting the desired audio signal that has been corrupted at a receiver end of the telecommunications system. In another implementation, the second digitised representation may be created by applying a distortion function to the known audio signal. Such a distortion function may exist in temporal or frequency domain. Examples include digital simulations of the telecommunication system such as a low rate speech coders and a noisy transmission channel. Another implementation involves the processor 305 adding a digitised sample of the environmental noise to the known audio signal. The distortion function may be implemented in the form of one of the software application programs 333 executable within the computer system 300, with the second digitised representation being stored in the memory 306.

The method 700 begins at the step 710, where the processor 305, in accordance with the method 100, uses the first digitised representation to determine a first set of second output functions, as described above. The first set of second output functions is stored in the memory 306. A salient formant point of the first set of second output functions will be referred to as an original salient formant point, $SFP_{ORIGINAL}$.

At the next step 715, the processor 305, in accordance with method 100 uses the second digitised representation to determine a second set of second output functions as described above. The second set of second output functions is stored in the memory 306. A salient formant point of the second set of second output functions will be referred to as a distorted salient formant point, $SFP_{DISTORT}$.

Then at the next step 720, the processor 305 determines a distance D between the salient formant point $SFP_{ORIGINAL}$ and $SFP_{DISTORT}$, using the two second output functions, in accordance with a difference function F as shown in Equation (3), below. The function F may represent various computational methods including simple subtraction, subtraction of absolute values, absolute value after subtraction, subtraction in a logarithmic domain, subtraction after a nonlinear transformation (such as taking an integer or a non-integer power), division, statistical detection, and other suitable methods.

$$D=F(SFP_{ORIGINAL}, SFP_{DISTORT}) \quad (3)$$

The method 700 continues to the next step 730, where the processor 305 predicts a subjective perception of the distortion. The subjective perception of the distortion is determined by various statistical analysis of the distance D that has been determined in the step 720. The subjective perception of the distortion may provide predictions of one or more distortions that are substantially localised in time. In one implementation the subjective perception of the distortion involves predicting one or more Diagnostic Acceptability Measure (DAM) parameters as shown in Table 1, below. Diagnostic acceptability measure parameters such as SF, SD, SI and SB are distortion descriptors which are known to be localised in time. Statistical analysis techniques may be used to calculate such parameters. For example, standard deviation of the distance D may be used to calculate the SB, SF and SI parameters. Alternatively, rate of evolution of the distortion (i.e. ∂D/∂t) could be used to calculate the SD parameters.

Furthermore, other statistical modelling and analysis techniques with higher complexity, e.g., Hidden Markov Modelling, Mixture models, Neural Networks and Polynomial Regression may also be used for speech quality prediction.

TABLE 1

| DAM Score | Description | Example |
|---|---|---|
| SD | Harsh | Peak Clipped Speech |
| SI | Interrupted | Packetized Speech with Glitches |
| SF | Fluttering | Interrupted Speech |
| SB | Babbling | Systems with Errors |
| SH | Thin | High Passed Speech |
| SL | Muffled | Low Passed Speech |
| ST | Thin | Band Passed Speech |
| SN | Nasal | 2.4 kbps Systems |

The diagnostic acceptability measure (DAM) parameters may be stored in the memory 306. The diagnostic acceptability measure (DAM) parameters may be additionally stored on one or more of the storage devices 309. Typically, the diagnostic acceptability measure (DAM) parameters are displayed on the display device 314.

Figure 8:
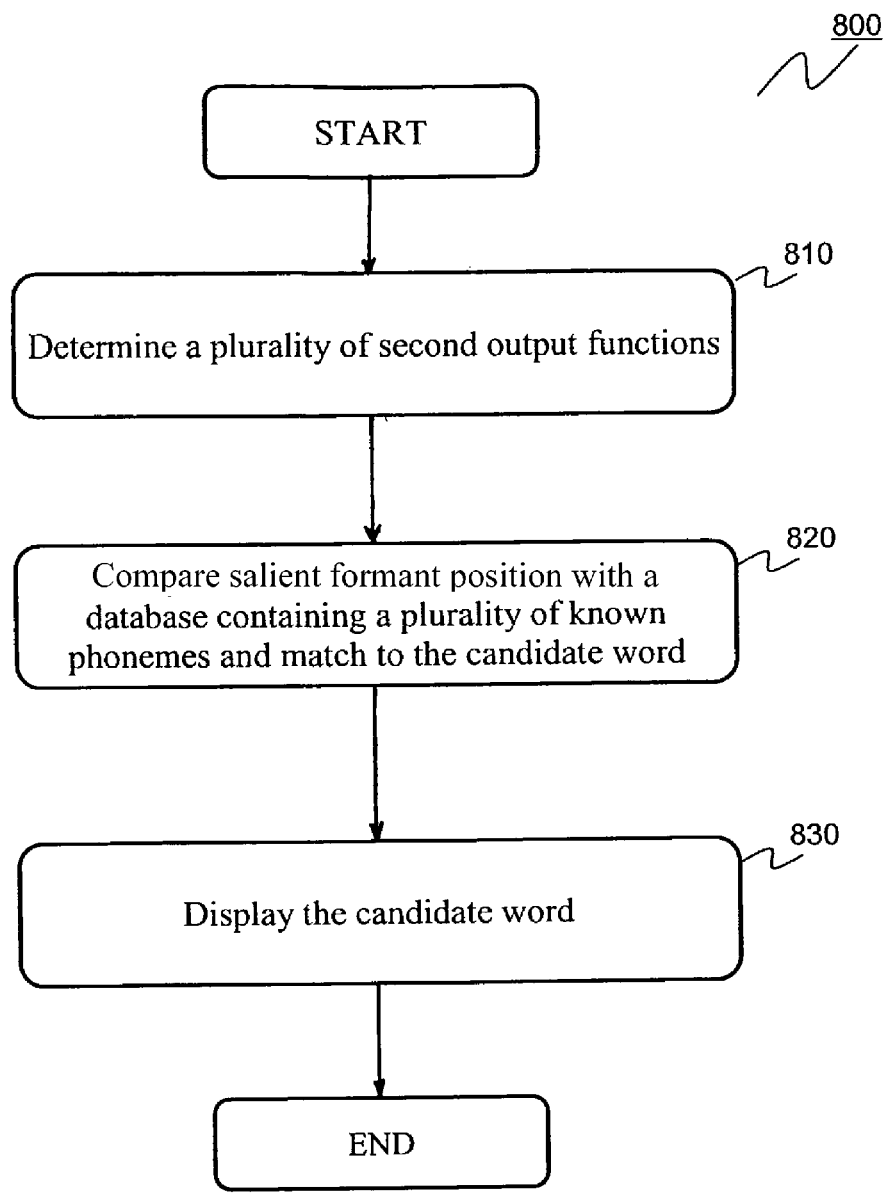
FIG. 8 is a flow diagram showing a method of speech recognition using salient formant points determined in accordance with the method of FIG. 1.

FIG. 8 is a flow diagram showing a method 800 of speech recognition using the salient formant point SFP determined in accordance with the method 100. The method 800 will be described by way of example with reference to a speech-to-text conversion system, such as a digital dictation software application. However, the method 800 may be used in various other applications such as speech based user interfaces (e.g., an interactive kiosk, a queuing system, call enquiry management). The method 800 may be implemented as software resident on the hard disk drive 310 and being controlled in its execution by the processor 305.

The method 800 begins at a step 810, where the processor 305, in accordance with the method 100, uses a digitised representation of a speech audio signal (e.g., from a person dictating) to determine a plurality of second output functions as described above. The plurality of second output functions is stored in the memory 306. The processor 305 selects a salient formant point SFP from the plurality of second output functions.

The method 800 continues to a step 820 where the processor 305 compares the salient formant point SFP with a plurality of known phonemes stored in a database. In one implementation the database is configured within the hard disk drive 310 or the memory 306. Each one of the phonemes is associated with at least part of a known word. Based on the comparison between the salient formant point and the phonemes, the processor 305 matches the salient formant point to a candidate word. In order to match the salient formant point to the candidate word at step 820, the processor 305 determines a distance between the salient formant point and the phoneme corresponding to the candidate word. The processor 305 may use any suitable statistical pattern recognition method to determine the distance at step 820. Such a pattern recognition method determines the distance (pattern) based on statistical information extracted from a set of distances. The statistical pattern recognition method may involve clustering, linear discriminant analysis, non-linear discriminant analysis, use of Bayes' theorem, Hidden Markov models, Gaussian Mixture models, and Neural networks. Accordingly, in accordance with the method 800, the salient formant point is used to evaluate the audio signal in order to determine the candidate word.

In one implementation, the processor 305 searches selectively through the database at step 820. The selective searching may involve a binary searching strategy, and a hash (lookup) table. The candidate word is the word in which the distance between the salient formant point SFP and the corresponding phoneme is below a set threshold. The set threshold may be defined by the program 333. In an alternative implementation the processor 305 may search through the entire database. In this instance, the candidate word is the word in which the distance between the salient formant point SFP and the corresponding phoneme is the minimum.

At the next step 830, the processor 305 displays the candidate word on the display unit 314.

Figure 4:
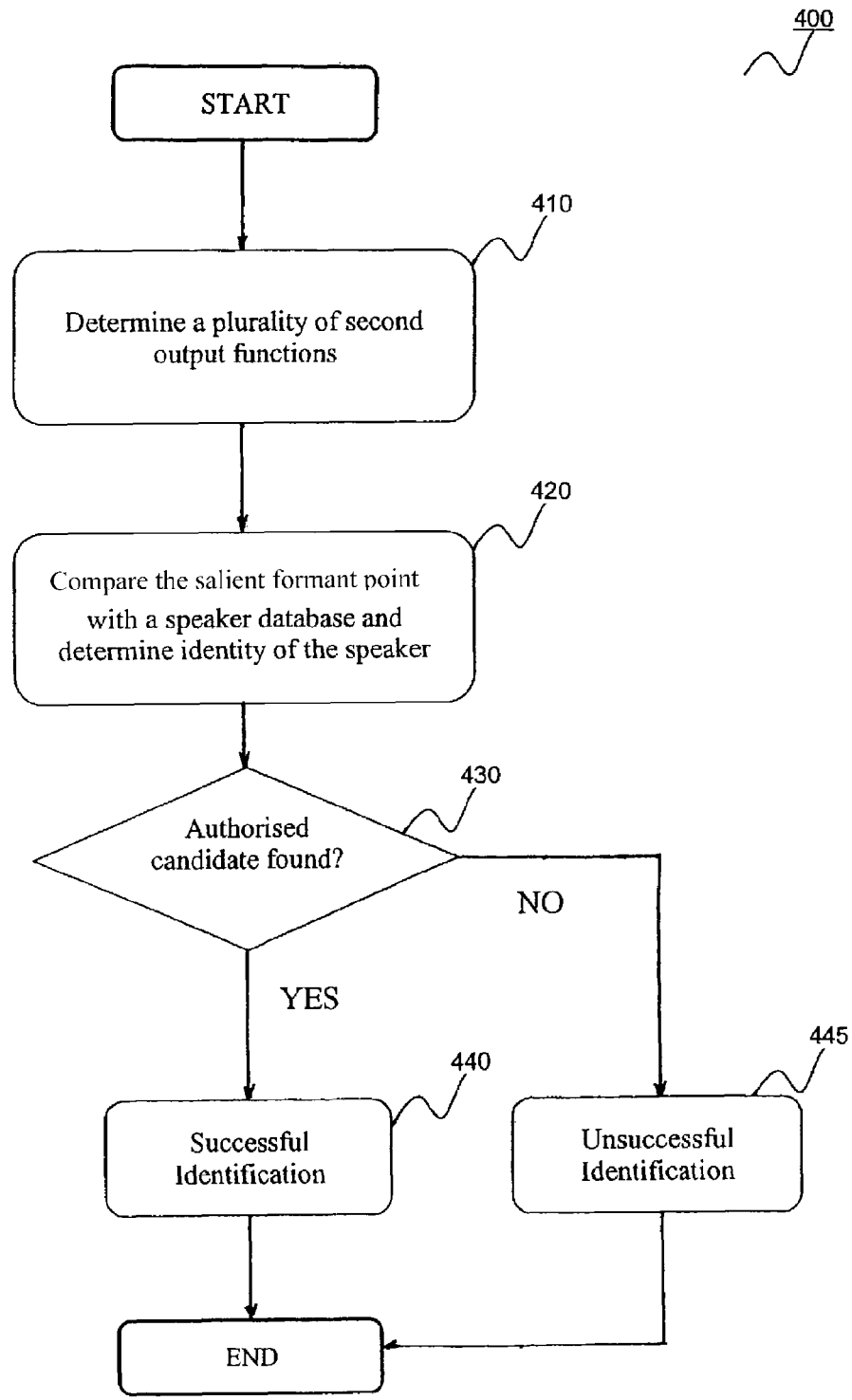
FIG. 4 is a flow diagram showing a method of speaker identification and verification using salient formant points determined in accordance with the method of FIG. 1.

FIG. 4 is a flow diagram showing a method 400 of person (or a "speaker") identification and verification in accordance with the method 100. The method 400 will be described by way of example with reference to a security access system, such as a security door which uses a speaker's voice as an authorisation key. However, the method 400 may be used in various other applications such as conference caller identification, surveillance and security applications. The method 400 may be implemented as software resident on the hard disk drive 310 and being controlled in its execution by the processor 305.

The method 400 begins at a step 410, where the processor 305, in accordance with the method 100 uses a digitised representation of an audio signal from a speaker (i.e., a person) to determine a plurality of second output functions as described above. The plurality of second output functions is stored in the memory 306. The processor 305 selects a salient formant point SFP from the plurality of second output functions.

The method 400 continues to a step 420 where the processor 305 compares the salient formant point SFP with a speaker database containing a plurality of known feature vectors for a plurality of authorised persons. Several known feature vectors may be assigned to each authorised person. Each authorised person may be authorised to have access to the security door. The speaker database may be stored either in the hard disk drive 310 or the disk storage medium 325. Alternatively, the speaker database may be accessed remotely through the local network 322 or the wide network 320. When the program 333 is executing, the speaker database, or at least a portion of the speaker database, is typically stored in either the memory 306 and/or the storage devices 309.

Based on the comparison between the salient formant point and the plurality of known feature vectors, the processor 305 determines: 1) whether the speaker exists on the speaker database, and if 1) is true, then 2) identity of the speaker, which corresponds to one of the authorised persons in the speaker database.

In order to identify the salient formant point to the authorised candidate at step 420, the processor 305 determines the distance between the salient formant point and the known feature vector corresponding to the authorised person. The processor 305 may use any suitable statistical pattern recognition method to determine the distance at step 420. Typically, the statistical pattern recognition method may involve clustering, linear discriminant analysis, non-linear discriminant analysis, use of Bayes' theorem, Hidden Markov models, Gaussian mixture modelling, Neural Networks. Accordingly, in accordance with the method 400, the salient formant point is used to evaluate the audio signal of the speaker in order to determine whether the speaker has access to the security door, and if so, identity of the authorised person. However, if the speaker is not contained in the speaker database (as the speaker is not authorised to have access) the authorised person will not be allowed entry.

In one implementation, the processor 305 searches selectively through the speaker database at step 420. The selective searching may involve a binary searching strategy, and a hash (look-up) table. In an alternative implementation the processor 305 may search through the entire database.

The method 400 continues to a test step 430, where the processor 305 determines whether one authorised person has been found by step 420. If the result of the test step 430 is true, then the method 400 proceeds according to a "YES" arrow to a step 440 which informs the speaker of the successful identification and opens the security door. Typically, this involves the computer system 300 controlling an actuator attached to a latch or a deadbolt of the security door. If the result of the test step 440 is false (the authorised candidate returned by the step 420 is empty), then the method 400 proceeds to a step 445 which informs the speaker of the unsuccessful identification.

Figure 9:
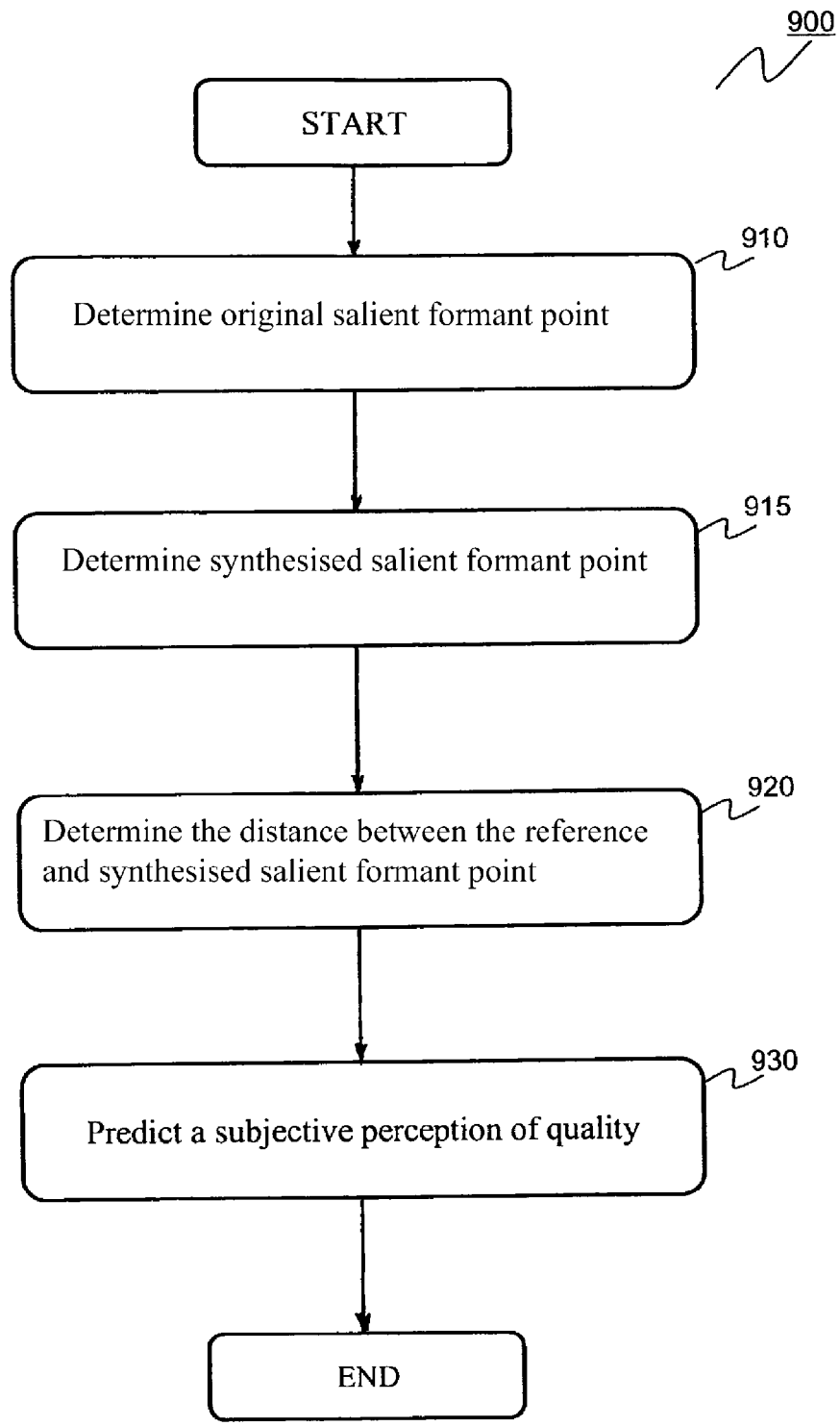
FIG. 9 is a flow diagram showing a method of evaluating hi-fidelity audio synthesis systems using salient formant points determined in accordance with the method of FIG. 1.

FIG. 9 is a flow diagram showing a method 900 of evaluating hi-fidelity audio synthesis systems using the salient formant points SFP determined in accordance with the method 100 may also be performed. The method 900 may be implemented as software resident on the hard disk drive 310 and being controlled in its execution by the processor 305.

The method 900 typically requires first and second digitised representations of audio signals. The first digitised representation is a desired audio signal, while the second digitised representation, is the desired audio signal that has been synthesised. The desired audio signal may be music or other complex audio signals.

The method 900 begins at the step 910, where the processor 305, in accordance with the method 100, uses the first digitised representation to determine a first set of second output functions as described above. The first set of second output functions is stored in the memory 306. A salient formant point of the first set of second output functions will be referred to as $SFP_{ORIGINAL}$.

At the next step 915, the processor 305, in accordance with method 100, uses the second digitised representation to determine a second set of second output functions as described above. The second set of second output functions is stored in the memory 306. A salient formant point of the second set of second output functions will be referred to as $SFP_{SYNTHESISED}$.

At the next step 920, the processor 305 determines a distance D between the salient formant point $SFP_{ORIGINAL}$ and $SFP_{SYNTHESISED}$, from the two second output functions by a difference function F as shown in Equation (4), below. The function F may represent various computational methods including simple subtraction, subtraction of absolute values, absolute value after subtraction, subtraction in a logarithmic domain, subtraction after a nonlinear transformation (such as taking an integer or a non-integer power), division, statistical detection, and other suitable methods.

$$D=F(SFP_{ORIGINAL}, SFP_{SYNTHESISED}) \quad (4)$$

At the subsequent step 930 the processor 305 predicts a subjective perception of quality. The subjective perception of quality may be determined by various statistical analysis of the distance D. Statistical analysis may comprise of standard deviation of the distance D, rate of evolution of the distance D (i.e. $\partial D/\partial t$), Hidden Markov Modelling, Mixture models, Neural Networks and Polynomial Regression.

The method of evaluating an audio signal, as described above, may alternatively be implemented in dedicated hardware such as one or more integrated circuits performing the functions or sub functions of characterising an audio signal. Such dedicated hardware may include graphic processors, digital signal processors, or one or more microprocessors and associated memories.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of analysing an audio signal, the audio signal comprising a speech signal, the method comprising the steps of:
   (a) receiving a digital representation of the audio signal;
   (b) generating a first output function, said first output function being a response of a physiological model of a human cochlea to the digital representation, the amplitude of the response representing presence of speech in the audio signal in terms of time and space;
   (c) selecting a temporal region of the first output function;
   (d) identifying a plurality of peaks from the selected temporal region of the first output function, said plurality of peaks being identified according to a rate of change of the amplitude in the temporal region;
   (e) comparing a first one of the plurality of peaks in a first temporal location with a spatially adjacent peak at a second temporal location to determine at least one property of the first output function by
      (i) comparing said first peak to said spatially adjacent peak to determine if said spatially adjacent peak is in a neighbourhood of said first peak; and
      (ii) generating a track function using the results of step (i), the track function storing locations of a plurality of said peaks in terms of time and space, wherein if said spatially adjacent peak is within the neighbourhood, said spatially adjacent peak is part of the same track as said first peak; and
   (f) determining one or more values for use in analysing the audio signal, based on the determined property of the first output function by
      (i) selecting a relevant spatial range according to a signal dependent threshold of energy of the first output function, and temporal distance between a plurality of neighbouring tracks of the first output function;
      (ii) determining a track center point for each of the plurality of tracks within the spatial range, each track center point representing a center of mass of a corresponding track of the first output function in the spatial range, each track centre point belonging to a plurality of second output functions; and
      (iii) determining a centre of mass of the determined track centre points to generate a salient formant point, wherein the salient formant point belongs to the plurality of the second output functions.

2. The method according to claim 1, wherein the determination is made at step (f) using the first output function.

3. A method according to claim 1, wherein the physiological model is a one, two 15 or three dimensional hydro-mechanical cochlear model, wherein the dimension refers to spatial dimensions.

4. A method according to claim 3, wherein the first output function includes a basilar membrane response.

5. A method according to claim 3, wherein the first output function includes an inner hair cell response.

6. A method according to claim 4, wherein the first output function is a dimensional matrix comprising first and second dimensions, the first dimension corresponding to a temporal axis and the second dimension corresponding to a spatial axis.

7. A method according to claim 5, wherein the first output function is a dimensional matrix comprising first and second dimensions, the first dimension corresponding to a temporal axis and the second dimension corresponding to a spatial axis.

8. The method according to claim 1, further comprising the step of determining an objective measure of speech quality based on the determined values extracted from the audio signal.

9. The method according to claim 1, further comprising the step of matching a word based on the determined values extracted from the audio signal.

10. The method according to claim 1, further comprising the step of identifying a speaker based on the determined values extracted from the audio signal.

11. An apparatus for analysing an audio signal, the audio signal comprising a speech signal, the apparatus comprising:
    means for receiving a digital representation of an audio signal;

means for generating a first output function, said first output function being a response of a physiological model of the human cochlea to the digital representation, the amplitude of the response representing presence of speech in the audio signal in terms of time and space;

means for selecting a temporal region of the first output function;

means for identifying a plurality of peaks from the selected temporal region of the first output function, said plurality of peaks being identified according to a rate of change of the amplitude in the temporal region;

means for comparing a first one of the plurality of peaks in a first temporal location with a spatially adjacent peak at a second temporal location to determine at least one property of the first output function by (i) comparing said first peak to said spatially adjacent peak to determine if said spatially adjacent peak is in a neighbourhood of said first peak; and (ii) generating a track function using the results of step (i), the track function storing locations of a plurality of said peaks in terms of time and space, wherein if said spatially adjacent peak is within the neighbourhood, said spatially adjacent peak is part of the same track as said first peak; and means for determining one or more values for use in analysing the audio signal, based on the determined property of the first output function by (i) selecting a relevant spatial range according to a signal dependent threshold of energy of the first output function, and temporal distance between a plurality of neighbouring tracks of the first output function;

(ii) determining a track center point for each of the plurality of tracks within the spatial range, each track center point representing a center of mass of a corresponding track of the first output function in the spatial range, each track centre point belonging to a plurality of second output functions; and (iii) determining a centre of mass of the determined track centre points to generate a salient formant point, wherein the salient formant point belongs to the plurality of the second output functions.

12. A system for analysing an audio signal, the audio signal comprising a speech signal, the system comprising:

a memory comprising data and a computer program;

a processor coupled to the memory for executing the computer program, the computer program comprising instructions for:

(a) receiving a digital representation of an audio signal;

(b) generating a first output function, said first output function being a response of a physiological model of the human cochlea to the digital representation, the amplitude of the response representing presence of speech in the audio signal in terms of time and space;

(c) selecting a temporal region of the first output function;

(d) identifying a plurality of peaks from the selected temporal region of the first output function, said plurality of peaks being identified according to a rate of change of the amplitude in the temporal region;

(e) comparing a first one of the plurality of peaks in a first temporal location with a spatially adjacent peak at a second temporal location to determine at least one property of the first output function by (i) comparing said first peak to said spatially adjacent peak to determine if said spatially adjacent peak is in a neighbourhood of said first peak; and (ii) generating a track function using the results of step (i), the track function storing locations of a plurality of said peaks in terms of time and space, wherein if said spatially adjacent peak is within the neighbourhood, said spatially adjacent peak is part of the same track as said first peak; and (f) determining one or more values for use in analysing the audio signal, based on the determined property of the first output function by (i) selecting a relevant spatial range according to a signal dependent threshold of energy of the first output function, and temporal distance between a plurality of neighbouring tracks of the first output function;

(ii) determining a track center point for each of the plurality of tracks within the spatial range, each track center point representing a center of mass of a corresponding track of the first output function in the spatial range, each track centre point belonging to a plurality of second output functions; and (iii) determining a centre of mass of the determined track centre points to generate a salient formant point, wherein the salient formant point belongs to the plurality of the second output functions.

\* \* \* \* \*